US008493647B2

(12) United States Patent
Fujisaku

(10) Patent No.: US 8,493,647 B2
(45) Date of Patent: Jul. 23, 2013

(54) COMPENSATION METHOD, OPTICAL MODULATION SYSTEM, AND OPTICAL DEMODULATION SYSTEM

(71) Applicant: Fujikura Ltd., Tokyo (JP)

(72) Inventor: Yoshiharu Fujisaku, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 13/748,000

(22) Filed: Jan. 23, 2013

(65) Prior Publication Data

US 2013/0135704 A1    May 30, 2013

Related U.S. Application Data

(63) Continuation of application No. PCT/JP2011/077382, filed on Nov. 28, 2011.

(30) Foreign Application Priority Data

Mar. 30, 2011  (JP) ................ 2011-076181

(51) Int. Cl.
*G02B 26/00* (2006.01)
*G02F 1/01* (2006.01)
*G02F 1/23* (2006.01)

(52) U.S. Cl.
USPC ............ 359/279; 359/239; 359/278

(58) Field of Classification Search
USPC .............. 359/237–239, 278–282, 285–287
See application file for complete search history.

(56) References Cited

U.S. PATENT DOCUMENTS

| 4,918,532 | A * | 4/1990 | O'Connor ............ 348/726 |
| 6,392,779 | B1 | 5/2002 | Iannelli et al. |
| 2004/0081470 | A1 | 4/2004 | Griffin |
| 2009/0245814 | A1 | 10/2009 | Griffin |
| 2011/0020013 | A1 | 1/2011 | Griffin |

FOREIGN PATENT DOCUMENTS

| JP | 3-251815 A | 11/1991 |
| JP | 2004-516743 A | 6/2004 |
| JP | 2007-181171 A | 7/2007 |
| WO | 2009/078435 A1 | 6/2009 |

OTHER PUBLICATIONS

International Search Report for PCT/JP2011/077382 dated Feb. 28, 2012.

* cited by examiner

*Primary Examiner* — Thomas K Pham
*Assistant Examiner* — Brandi Thomas
(74) *Attorney, Agent, or Firm* — Sughrue Mion, PLLC

(57) ABSTRACT

An optical modulation system has a function to compensate an operating point drift, which occurs in an MZ optical modulator, by carrying out feedback control with use of a low frequency signal. A judgment section judges stability of feedback control. In a case where the feedback control is determined to be unstable, a low frequency signal generating section switches a frequency of the low frequency signal from a first frequency to a second frequency.

6 Claims, 5 Drawing Sheets

COMPENSATION METHOD, OPTICAL MODULATION SYSTEM, AND OPTICAL DEMODULATION SYSTEM

CROSS-REFERENCE TO RELATED APPLICATIONS

This application is a Continuation of PCT International Application No. PCT/JP2011/077382 filed in Japan on Nov. 28, 2011, which claims the benefit of Patent Application No. 2011-076181 filed in Japan on Mar. 30, 2011, the entire contents of which are hereby incorporated by reference.

TECHNICAL FIELD

The present invention relates to a compensation method for compensating an operating point drift or a phase drift, which occurs in an optical device, by carrying out feedback control with the use of a low frequency signal. Further, the present invention relates to an optical modulation system and an optical demodulation system which use the compensation method.

BACKGROUND ART

As one of optical modulators for modulating laser light, $LiNbO_3$ modulators (hereinafter, referred to as "LN modulator") are widely used. The LN modulator is one of Mach-Zehnder optical modulators (hereinafter, referred to as "MZ optical modulator"). Such an LN modulator outputs light, for example, as follows. That is, the LN modulator generates output light by (1) branching input laser light so that branched laser lights enter respective two waveguides to which respective voltages, whose directions are opposite to each other, are applied, (2) causing (i) laser light to have a phase advance of amount $\phi$ in a first waveguide and (ii) laser light to have a phase delay of amount $\phi$ in a second waveguide, and (3) interferometrically combining the laser light (hereinafter, referred to as "advance light") whose phase has been advanced by the amount $\phi$ through the first waveguide and the laser light (hereinafter, referred to as "delay light") whose phase has been delayed by the amount $\phi$ through the second waveguide.

The amount $\phi$ by which the phase is advanced or delayed in the LN modulator is determined in accordance with an externally applied driving voltage V. In a case where a predetermined voltage V0, which causes the advance light and the delay light to have reversed phases, is applied as the driving voltage V, the advance light and the delay light destructively interfere with each other, so that intensity of output light (i.e., electric power of output light) is minimized. On the other hand, in a case where a predetermined voltage V1, which causes the advance light and the delay light to have identical phases, is applied as the driving voltage V, the advance light and the delay light constructively interfere with each other, so that intensity of output light is maximized. In view of this, it is possible to generate an optical signal, whose intensity has been modulated in accordance with an input signal, by applying (i) a driving voltage V (=V0) when a value of the input signal (data signal) is 0 or (ii) a driving voltage V (=V1) when the value of the input signal is 1.

It is known that the LN modulator has a problem of an operating point drift. Note that the "operating point drift" means a phenomenon in which an applied voltage V, which causes output light to have minimum or maximum intensity, is shifted from the predetermined voltage V0 or V1 due to a change with time or a disturbance. The disturbance causing the operating point drift is typically a temperature change.

Patent Literature 1 discloses a well known compensation method for compensating an operating point drift. FIG. 7 illustrates a configuration of an optical modulation system 100 disclosed in Patent Literature 1. The optical modulation system 100 includes a light source 111, a driving circuit 112, an LN modulator (external modulator) 113, a low frequency oscillator 114, a low frequency signal superimposing means 115, a low frequency signal detection means 116, and a control means 117 (see FIG. 7).

According to the optical modulation system 100, the LN modulator 113 serves as an external modulator for modulating, in accordance with an input signal #1, intensity of laser light emitted by the light source 111. Note, however, that the driving circuit 112 applies, to the LN modulator 113, a driving voltage V which is not determined in accordance with a value of the input signal #1 itself but is determined in accordance with a value of an input signal #3 whose amplitude has been modulated in accordance with a low frequency signal #2. The low frequency oscillator 114 is provided so as to generate the low frequency signal #2. The low frequency signal superimposing means 115 is provided so as to modulate an amplitude of the input signal #1 in accordance with the low frequency signal #2. Here, the low frequency signal #2 may be a signal (such as that of a sine wave, a rectangular wave, or a triangular wave) having a frequency f0 which is sufficiently lower than a frequency of the input signal #1.

In a case where the driving voltage V, which is determined in accordance with the value of the input signal #3 whose amplitude has been modulated in accordance with the low frequency signal #2, is thus applied to the LN modulator 113, the LN modulator 113 can be considered to output an optical signal L having the following features: That is, in a case where no operating point drift occurs, the optical signal L outputted by the LN modulator 113 contains a low-frequency component having a frequency twice as high as the frequency f0 of the low frequency signal #2. On the other hand, in a case where an operating point drift occurs, the optical signal L outputted by the LN modulator 113 contains a low-frequency component having a frequency identical with the frequency f0 of the low frequency signal #2. In this case, a phase difference between (i) the low-frequency component (having the frequency identical with the frequency f0) contained in the optical signal L and (ii) the low frequency signal #2 becomes 0 or Π depending on a direction of the operating point drift.

The low frequency signal detection means 116 detects a low-frequency component, which has the frequency identical with the frequency f0, from the optical signal L (more properly, a voltage signal obtained by carrying out a photoelectric conversion and a current-voltage conversion with respect to the optical signal L) outputted by the LN modulator 113. Moreover, the low frequency signal detection means 116 compares a phase of a detected low-frequency component with a phase of the low frequency signal #2 so as to specify a direction of the operating point drift. The control means 117 supplies, to the driving circuit 112, a control signal #4 for changing an operating point of the driving circuit 112 in accordance with the direction of the operating point drift specified by the low frequency signal detection means 116. The driving circuit 112 changes an applied voltage V, which is to be applied to the LN modulator 113, based on the control signal #4 supplied from the control means 117. Specifically, in a case where the value of the input signal #1 is 0, the driving circuit 112 changes the applied voltage V from the predetermined voltage V0 to a voltage V0±dV. Alternatively, in a case where the value of the input signal #1 is 1, the driving circuit 112 changes the applied voltage V from the predetermined voltage V1 to a voltage V1±dV.

The optical modulation system 100 compensates an operating point drift by carrying out such feedback control. This makes it possible to achieve a stable feedback control and to generate a stable optical signal.

Delay interferometers are widely used as an optical demodulator for demodulating an optical signal whose phase has been modulated. The delay interferometer generates output light by (1) branching input signal light so that branched signal lights enter respective two waveguides having different lengths and (2) interferometrically combine (i) first signal light, which has passed through a first waveguide (i.e., a longer waveguide), and (ii) second signal light, which has passed through a second waveguide (i.e., a shorter waveguide).

A state of the output light of the delay interferometer is determined based on a phase difference between the first signal light and the second signal light. In a case where the lengths of the first and second waveguides are set so that the first signal light is delayed with respect to the second signal light by one (1) symbol, it is possible to obtain output light having a state determined in accordance with a phase difference (hereinafter, referred to as "inter-symbol phase difference") between signal light (i.e., first signal light) corresponding to a previous symbol and signal light (i.e., second signal light) corresponding to a current symbol.

An optical coupler having two output ports is used to interferometrically combine the first signal light and the second signal light. A demodulated signal is obtained by differentially amplifying current signals, which have been obtained by photoelectrically converting optical signals outputted from the respective two output ports, with the use of a transimpedance amplifier. In a case where the inter-symbol phase difference is 0, a value of the demodulated signal is maximized. In a case where the inter-symbol phase difference is n, a value of the demodulated signal is minimized.

A DBPSK (optical differential binary phase shift keying) demodulator includes a single delay interferometer. In the DBPSK demodulator, an optical signal, which has been subjected to a DBPSK modulation, is converted to the intensity modulated signal by the delay interferometer. Then, the optical signal, whose intensity has been modulated, is subjected to a photoelectric conversion so that a demodulated signal is obtained. A DQPSK (optical differential quadrature phase shift keying) demodulator includes two delay interferometers having different delay amounts. In the DQPSK demodulator, each of the delay interferometers converts an optical signal, which has been subjected to a DQPSK modulation, to the two intensity modulated signals. Then, the two optical signals are subjected to a photoelectric conversion so that an I-channel demodulated signal and a Q-channel demodulated signal are obtained. Note that details of the DQPSK demodulator are disclosed in, for example, Patent Literature 2.

The delay interferometer also has a problem similar to an operating point drift in the LN modulator. That is, in a case where a wavelength of signal light or a temperature of the delay interferometer is changed, an inter-symbol phase difference is shifted from a predetermined value. This phenomenon is called "phase drift."

In order to compensate such a phase drift, a low frequency signal can be used. Specifically, such a phase drift can be compensated by (1) slightly oscillating a delay amount, by which signal light that has entered the first waveguide is delayed with respect to signal light that has entered the second waveguide, with the use of a low frequency signal and (2) increasing or decreasing the delay amount in accordance with a phase difference between the low frequency signal and a low-frequency component contained in a demodulated signal. Note that the increasing or decreasing of the delay amount can be carried out by, for example, raising or reducing a temperature of a medium constituting the first waveguide or the second waveguide with the use of a heater.

Citation List

Patent Literatures

Patent Literature 1

Japanese Patent Application Publication Tokukaihei No. 3-251815 A (Publication date: Nov. 11, 1991)

Patent Literature 2

Japanese Translation of PCT International Application Tokuhyo No. 2004-516743 A (Publication date: Jun. 3, 2004)

SUMMARY OF INVENTION

Technical Problem

However, the conventional optical modulation system has a problem that, in a case where a noise (hereinafter, referred to as "low frequency noise") is mixed which has a frequency approximate to that of a low frequency signal for compensating an operating point drift, feedback control of the LN modulator becomes unstable when the low frequency noise is amplified at a high magnification.

A low frequency noise which causes the feedback control of the LN modulator to be unstable is typically a power supply noise. In a case where, for example, a switching regulator is employed as a power supply device, a spike noise can be periodically caused by the switching regulator. Moreover, in a case where the frequency of the low frequency signal for compensating the operating point drift is approximate to a frequency of the spike noise, the feedback control of the LN modulator may be destabilized because the spike noise is amplified at a high magnification.

Note that the frequency of the spike noise can be changed depending on a factor such as a temperature. Under the circumstances, in a case where the frequency of the low frequency signal for compensating the operating point drift is constant, unstable feedback control may be triggered by a temperature change or the like, even though the feedback control is stably carried out at first. Moreover, the frequency of the spike noise can vary depending on a configuration of a power supply device used together. Under the circumstances, in a case where the frequency of the low frequency signal for compensating the operating point drift is constant, unstable feedback control may be triggered by a change in a power supply device used together, even though the feedback control is stably carried out at first.

A similar problem can occur in the conventional optical demodulation system. The delay interferometer is affected by a change in wavelength of signal light or in temperature of the delay interferometer. In a case where a polarization scrambler is used to average polarization dependencies of the optical amplifier, intensity and waveform of an optical signal supplied to the delay interferometer may be periodically changed at a frequency of the polarization scrambler. In a case where a frequency of a low frequency signal for compensating a phase drift is approximate to the frequency of the polarization scrambler, the feedback control of the delay interferometer may be destabilized when the change of the intensity and waveform of the optical signal is amplified at a high magnification.

The present invention is accomplished in view of the problems, and its object is to provide a compensation method for compensating an operating point drift or a phase drift, which occurs in an optical device, by carrying out more stably feedback control with the use of a low frequency signal.

Solution to Problem

A compensation method of the present invention is a method for compensating an operating point drift or a phase drift, which occurs in an optical device, by carrying out feedback control with use of a low frequency signal. In order to attain the object, the compensation method of the present invention includes the steps of: (A) judging stability of the feedback control; and (B) switching a frequency of the low frequency signal from a first frequency to a second frequency which is different from the first frequency, in a case where the feedback control is determined to be unstable in the step (A), the step (A) including at least one of a first judging step and a second judging step, in the first judging step, the stability of the feedback control being determined by comparing (i) a moving average of phase differences between (a) low-frequency components contained in a signal generated by the optical device and (b) the low frequency signal with (ii) a predetermined threshold, and in the second judging step, the stability of the feedback control being determined by comparing (i) a variation in bias which is to be given to the optical device and is determined in accordance with the phase difference with (ii) a predetermined threshold.

An optical modulation system of the present invention is an optical modulation system having a function to compensate an operating point drift, which occurs in an optical modulator, by carrying out feedback control with use of a low frequency signal. In order to attain the object, the optical modulation system of the present invention includes a judgment section for judging stability of the feedback control; and a low frequency signal generating section for generating the low frequency signal, in a case where the judgment section determines that the feedback control is unstable, the low frequency signal generating section switching a frequency of the low frequency signal from a first frequency to a second frequency which is different from the first frequency, the judgment section including at least one of a first judgment section and a second judgment section, the first judgment section determining the stability of the feedback control by comparing (i) a moving average of phase differences between (a) low-frequency components contained in a signal generated by the optical modulator and (b) the low frequency signal with (ii) a predetermined threshold, and the second judgment section determining the stability of the feedback control by comparing (i) a variation in bias which is to be given to the optical modulator and is determined in accordance with the phase difference with (ii) a predetermined threshold.

An optical demodulation system of the present invention is an optical demodulation system having a function to compensate a phase drift, which occurs in an optical demodulator, by carrying out feedback control with use of a low frequency signal. In order to attain the object, the optical demodulation system of the present invention includes a judgment section for judging stability of the feedback control; and a low frequency signal generating section for generating the low frequency signal, in a case where the judgment section determines that the feedback control is unstable, the low frequency signal generating section switching a frequency of the low frequency signal from a first frequency to a second frequency which is different from the first frequency, the judgment section including at least one of a first judgment section and a second judgment section, the first judgment section determining the stability of the feedback control by comparing (i) a moving average of phase differences between (a) low-frequency components contained in a signal generated by the optical demodulator and (b) the low frequency signal with (ii) a predetermined threshold, and the second judgment section determining the stability of the feedback control by comparing (i) a variation in bias which is to be given to the optical demodulator and is determined in accordance with the phase difference with (ii) a predetermined threshold.

Advantageous Effects of Invention

According to the present invention, in a case where the feedback control is destabilized by a factor such as a low frequency noise having a frequency approximate to the frequency of the low frequency signal, the feedback control can be stabilized again by switching the frequency of the low frequency signal from the first frequency to the second frequency. This makes it possible to carry out feedback control more stably than a conventional technique.

DESCRIPTION OF EMBODIMENTS

[Embodiment 1]

Figure 1:
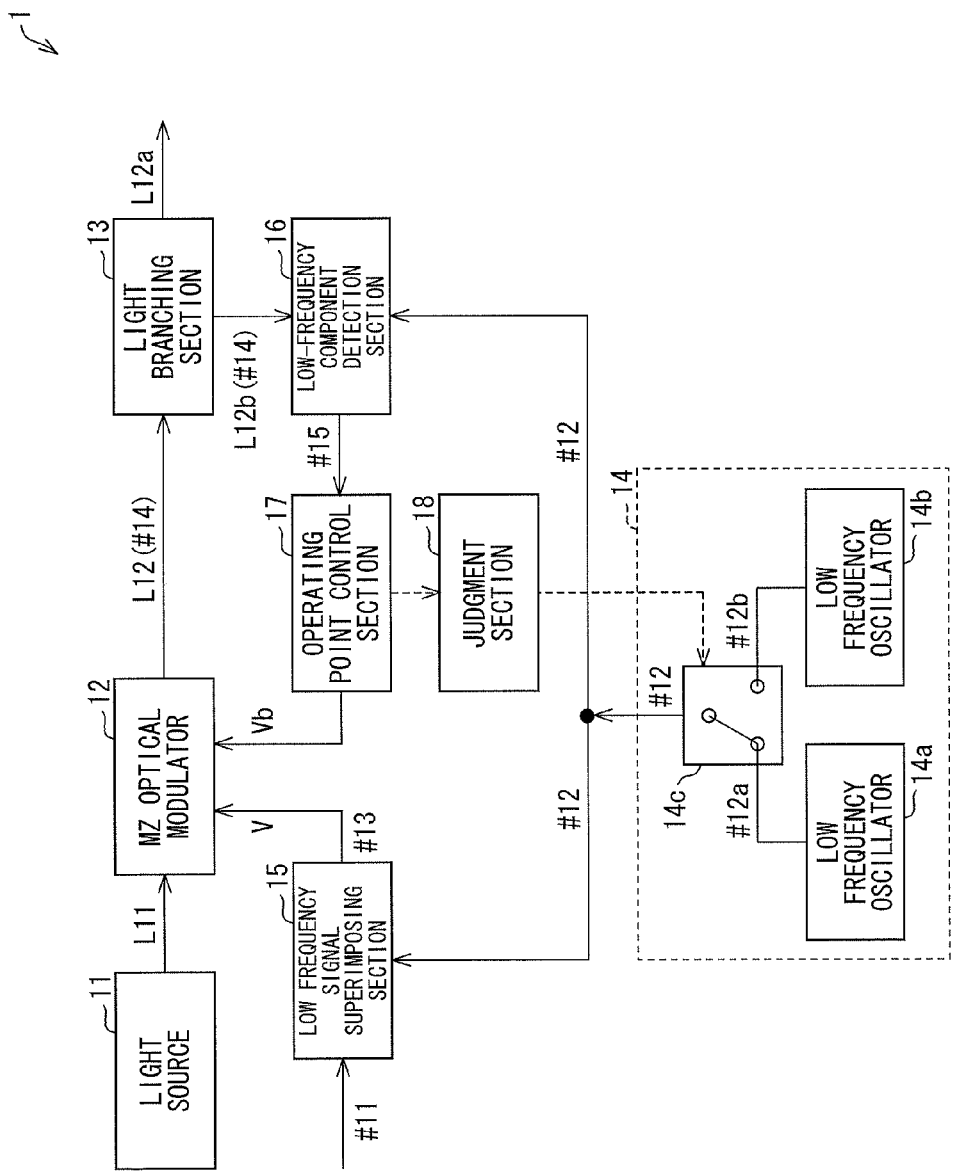
FIG. 1 is a block diagram illustrating a configuration of an optical modulation system, in accordance with Embodiment 1 of the present invention.
Figure 2:
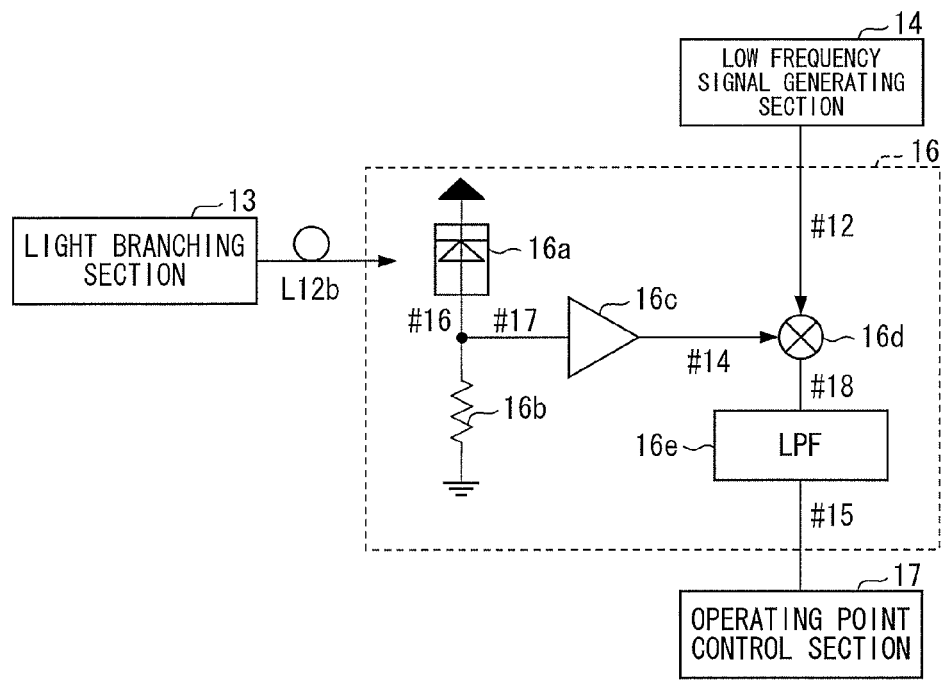
FIG. 2 is a circuit diagram illustrating a configuration of a low-frequency component detection section included in the optical modulation system illustrated in FIG. 1.
Figure 3:
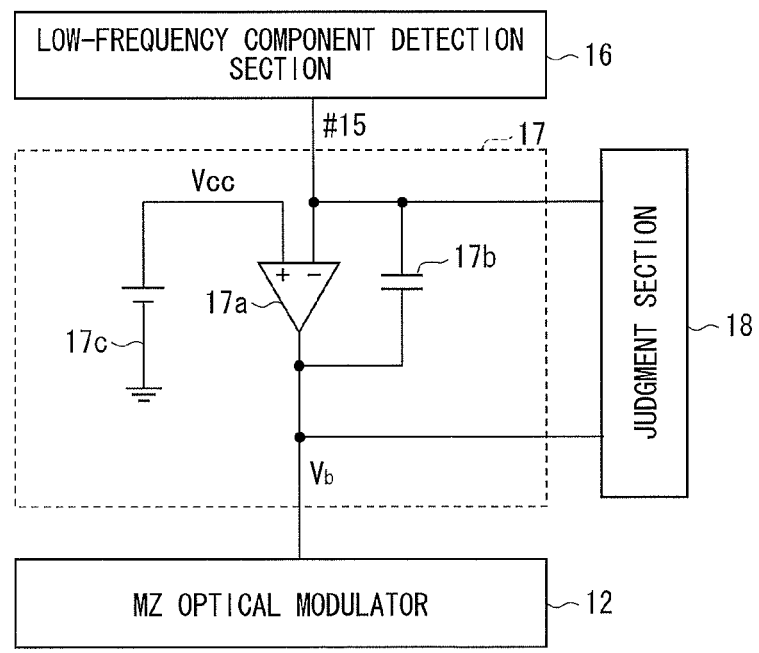
FIG. 3 is a circuit diagram illustrating a configuration of an operating point control section included in the optical modulation system illustrated in FIG. 1.

The following description will discuss a configuration of an optical modulation system in accordance with Embodiment 1 of the present invention, with reference to FIGS. 1 through 3. FIG. 1 is a block diagram illustrating a configuration of an optical modulation system 1 in accordance with Embodiment 1. FIG. 2 is a circuit diagram illustrating an example configuration of a low-frequency component detection section 16 included in the optical modulation system 1. FIG. 3 is a circuit diagram illustrating an example configuration of an operating point control section 17 included in the optical modulation system 1.

The optical modulation system 1 (i) generates an optical signal L12 whose intensity is modulated in accordance with an input signal #11 (data signal) which has been externally supplied and (ii) outputs a generated optical signal L12 to an outside of the optical modulation system 1. The optical modulation system 1 is incorporated in, for example, a transmitter so as to be utilized to carry out optical communications.

The optical modulation system 1 includes a light source 11, a Mach-Zehnder optical modulator (hereinafter, referred to as "MZ optical modulator") 12, a light branching section 13, a low frequency signal generating section 14, a low frequency signal superimposing section 15, a low-frequency component detection section 16, an operating point control section 17, and a judgment section 18 (see FIG. 1).

The light source 11 is means for emitting continuous light L11. Note here that the "continuous light" means, for example, light having constant (temporally constant) intensity. The continuous light L11 emitted by the light source 11 is directed toward the MZ optical modulator 12. Examples of the light source 11 encompass a semiconductor laser. Note that the light source 11 does not need to be included in the optical modulation system 1 when the optical modulation system 1 is shipped as a product, provided that the light source 11 is included in the optical modulation system 1 during using of the optical modulation system 1. In other words, it is possible to distribute, as a product, not only the optical modulation system 1 illustrated in FIG. 1 but also an optical modulation system 1 without the light source 11.

The MZ optical modulator 12 is means for generating an optical signal L12 by modulating intensity of continuous light L11 in accordance with a driving signal #13. Note here that the wording "modulating intensity of continuous light L11 in accordance with a driving signal #13" means, for example, (i) intensity of output light being minimized (i.e., the continuous light L11 is blocked) in a case where a driving voltage V (i.e., a value of the driving signal #13) is a first predetermined voltage V0, and (ii) intensity of output light being maximized (i.e., the continuous light L11 is passed through) in a case where the driving voltage V is a second predetermined voltage V1. Note, however, that a variation φ in phase of the MZ optical modulator 12 is determined in accordance with a sum (V+Vb), i.e., a sum of (i) a driving voltage V supplied from the low frequency signal superimposing section 15 and (ii) a bias voltage Vb supplied from the operating point control section 17. An optical signal L12 generated by the MZ optical modulator 12 is supplied to the light branching section 13. Examples of the MZ optical modulator 12 encompass an LiNbO$_3$ modulator (hereinafter, referred to as "LN modulator").

The light branching section 13 is means for branching an optical signal L12. A part (hereinafter, referred to as "optical signal L12a") of the optical signal L12 is supplied to the outside and another part (hereinafter, referred to as "optical signal L 12b") of the optical signal L12 is supplied to the low-frequency component detection section 16. Examples of the light branching section 13 encompass an optical coupler.

The low frequency signal generating section 14 is means for generating a low frequency signal #12. A low frequency signal #12 generated by the low frequency signal generating section 14 is supplied to the low frequency signal superimposing section 15 and the low-frequency component detection section 16. The low frequency signal generating section 14 is characterized by being capable of switching a frequency f0 of a low frequency signal #12 to be generated.

FIG. 1 illustrates an example configuration of the low frequency signal generating section 14. According to the example configuration illustrated in FIG. 1, the low frequency signal generating section 14 includes a first low frequency oscillator 14a, a second low frequency oscillator 14b, and a switch 14c.

According to the example configuration illustrated in FIG. 1, the first low frequency oscillator 14a generates a low frequency signal #12a having a predetermined frequency f0a. The low frequency signal #12a can have an arbitrary waveform (such as that of a sine wave, a rectangular wave, or a triangular wave), provided that the low frequency signal #12a has the frequency f0a. The second low frequency oscillator 14b generates a low frequency signal #12b having a predetermined frequency f0b. The low frequency signal #12b can also have an arbitrary waveform (such as that of a sine wave, a rectangular wave, or a triangular wave), provided that the low frequency signal #12b has the frequency f0b.

The frequencies f0a and f0b are (1) sufficiently lower than a frequency of an input signal #11 and (2) different from each other. It is preferable that a ratio f0a:f0b is not a simple ratio of integers for reasons later described. The term "simple ratio of integers" means a ratio which can be expressed by small integers, e.g., integers not larger than 10 (for example, "1:2", "2:3", and "1:10" are all simple ratios of integers). For example, the frequency f0a is 905 Hz, and the frequency f0b is 1000 Hz.

According to the example configuration illustrated in FIG. 1, the low frequency signal #12a and the low frequency signal #12b are supplied to the switch 14c. The switch 14c (i) selects one of the low frequency signal #12a and the low frequency signal #12b and (ii) supplies, as a low frequency signal #12, a selected one of the low frequency signals #12a and #12b to the low frequency signal superimposing section 15 and the low-frequency component detection section 16. In other words, the switch 14c (i) selects one of the frequency f0a and the frequency f0b and (ii) supplies a low frequency signal #12, which has a selected one of the frequencies f0a and f0b, to the low frequency signal superimposing section 15 and the low-frequency component detection section 16.

Note that, in the following description, a frequency of the low frequency signal #12 will be referred to as "frequency f0." Specifically, in a case where the low frequency signal #12a is selected as the low frequency signal #12, the frequency f0 is equal to f0a, whereas in a case where the low frequency signal #12b is selected as the low frequency signal #12, the frequency f0 is equal to f0b.

The low frequency signal superimposing section 15 is means for generating a driving signal #13 by superimposing a low frequency signal #12 on an input signal #11. The wording "superimposing a low frequency signal #12 on an input signal #11" means, for example, modulating an amplitude of the input signal #11 in accordance with the low frequency signal #12. A driving signal #13 generated by the low frequency signal superimposing section 15 is supplied to the MZ optical modulator 12.

The low-frequency component detection section 16 is means for detecting a low-frequency component #14 which (i) is contained in an optical signal L12b (more properly, a voltage signal obtained by carrying out a photoelectric conversion and a current-voltage conversion with respect to the optical signal L12b) and (ii) has a frequency f0 (which is identical with a frequency of a low frequency signal #12). The low-frequency component detection section 16 is also means for comparing a phase of the low-frequency component #14 with a phase of the low frequency signal #12 so as to generate a phase difference signal #15 having a value D which varies depending on a difference between the two phases. A phase difference signal #15, generated by the low-frequency component detection section 16, is supplied to the operating point control section 17.

FIG. 2 illustrates an example configuration of the low-frequency component detection section 16. According to the example configuration illustrated in FIG. 2, the low-frequency component detection section 16 includes a photodiode 16a, a resistor 16b, a band-pass amplifier 16c, a mixer 16d, and an LPF (low-pass filter) 16e.

According to the example configuration illustrated in FIG. 2, an optical signal L12b supplied from the light branching section 13 is converted into a current signal #16 by the photodiode 16a (i.e., subjected to a photoelectric conversion), and then the current signal #16 is converted into a voltage signal #17 by the resistor 16b (i.e., subjected to a current-voltage conversion). The voltage signal #17 is supplied to the band-pass amplifier 16c. The band-pass amplifier 16c is an amplifier whose amplification target band is restricted to the vicinity of a frequency f0 (identical with a frequency of the low frequency signal #12). The band-pass amplifier 16c selectively amplifies a low-frequency component #14 which is contained in the voltage signal #17 and has the frequency f0. Note here that the amplification target band of the band-pass amplifier 16c is set so as to contain the frequencies f0a and f0b.

According to the example configuration illustrated in FIG. 2, (i) a low-frequency component #14, which has been selectively amplified by the band-pass amplifier 16c, is supplied to the mixer 16d via one of input terminals of the mixer 16d and (ii) a low frequency signal #12, which has been generated by the low frequency signal generating section 14, is supplied to the mixer 16d via the other of the input terminals. The mixer 16d multiplies the low-frequency component #14 by the low frequency signal #12. An output signal #18 of the mixer 16d contains a sum frequency component and a difference frequency component. The sum frequency component is equal to a frequency component whose frequency is a sum of a frequency of the low-frequency component #14 and a frequency of the low frequency signal #12 (that is, the sum is twice the frequency f0 of the low frequency signal #12). The difference frequency component is equal to a frequency component whose frequency is a difference between a frequency of the low-frequency component #14 and a frequency of the low frequency signal #12. The LPF 16e extracts the difference frequency component from the output signal #18 of the mixer 16d by removing the sum frequency component. A phase difference signal #15 is thus generated, which has a value D that varies depending on a phase difference between the low-frequency component #14 and the low frequency signal #12.

The operating point control section 17 is means for (i) generating a bias voltage Vb in accordance with a phase difference signal #15 and (ii) applying a generated bias voltage Vb to the MZ optical modulator 12. The bias voltage Vb generated by the operating point control section 17 is not limited to a particular voltage, provided that the bias voltage Vb can be used to compensate an operating point drift occurring in the MZ optical modulator 12. According to Embodiment 1, an integrated value obtained by integrating the phase difference signal #15 is employed as the bias voltage Vb.

FIG. 3 illustrates an example configuration of the operating point control section 17. The operating point control section 17 illustrated in FIG. 3 includes an operational amplifier 17a, a capacitor 17b, and a constant voltage source 17c.

According to the example configuration of FIG. 3, a phase difference signal #15 is supplied to the operational amplifier 17a via an inverting input terminal, and a constant voltage Vcc, which has been generated by the constant voltage source 17c, is supplied to the operational amplifier 17a via a non-inverting input terminal. An output terminal and the inverting input terminal of the operational amplifier 17a are connected with each other via the capacitor 17b. In other words, the operational amplifier 17a, the capacitor 17b, and the constant voltage source 17c constitute an integrating circuit for integrating a value D (i.e., a difference in electric potential between the inverting input terminal and the non-inverting input terminal) of the phase difference signal #15. An integrated value obtained by integrating the value D of the phase difference signal #15 is supplied, as a bias voltage Vb, to the MZ optical modulator 12.

The value D of the phase difference signal #15, which has been supplied to the operating point control section 17, is converted by an AD converter (not illustrated) into a digital value and is then supplied to the judgment section 18. Moreover, the bias voltage Vb which is to be outputted from the operating point control section 17 is converted by an AD converter (not illustrated) into a digital value and is then supplied to the judgment section 18. The judgment section 18 is means for judging stability of feedback control based on the value D of the phase difference signal #15 and the bias voltage Vb. Examples of the judgment section 18 encompass a microcomputer. How the judgment section 18 judges stability of feedback control will be described later.

Each time a transition in judgment result occurs from "stable" to "unstable", the judgment section 18 controls the low frequency signal generating section 14 to change a frequency f0 of a low frequency signal #12 to be generated. Specifically, each time a transition in judgment result occurs from "stable" to "unstable", the judgment section 18 controls switching of the switch 14c in the low frequency signal generating section 14. As a result, (1) in a case where the transition in judgment result occurs from "stable" to "unstable" while the frequency f0 of the low frequency signal #12 is f0a, the frequency f0 is switched from f0a to f0b, whereas (2) in a case where the transition in judgment result occurs from "stable" to "unstable" while the frequency f0 is f0b, the frequency f0 is switched from f0b to f0a.

This makes it possible to stabilize the feedback control in both cases where (1) the feedback control is destabilized because a low frequency noise having a frequency f0a is mixed while the frequency f0 of the low frequency signal #12 is being f0a and (2) the feedback control is destabilized because a low frequency noise having a frequency f0b is mixed while the frequency f0 of the low frequency signal #12 is being f0b. That is, even in a case where a low frequency noise is mixed, a stable feedback control can be restored.

Note that low frequency noises, which have respective different frequencies, are sometimes concurrently mixed in the optical modulation system 1. In this case, the frequencies of the respective low frequency noises tend to be in a ratio of integers. Such low frequency noises are a typical example of higher harmonic noises occurring in a power supply device. In a case where the frequencies f0a and f0b are set so that a ratio of f0a to f0b (f0a:f0b) becomes a simple ratio of integers, feedback control sometimes cannot be stabilized even if the frequency f0 of the low frequency signal #12 is switched from f0a to f0b or vice versa. On the other hand, in a case where the frequencies f0a and f0b are set so that the ratio of f0a to f0b (f0a:f0b) does not become a simple ratio of integers, feedback control is more likely to be stabilized.

Figure 4:
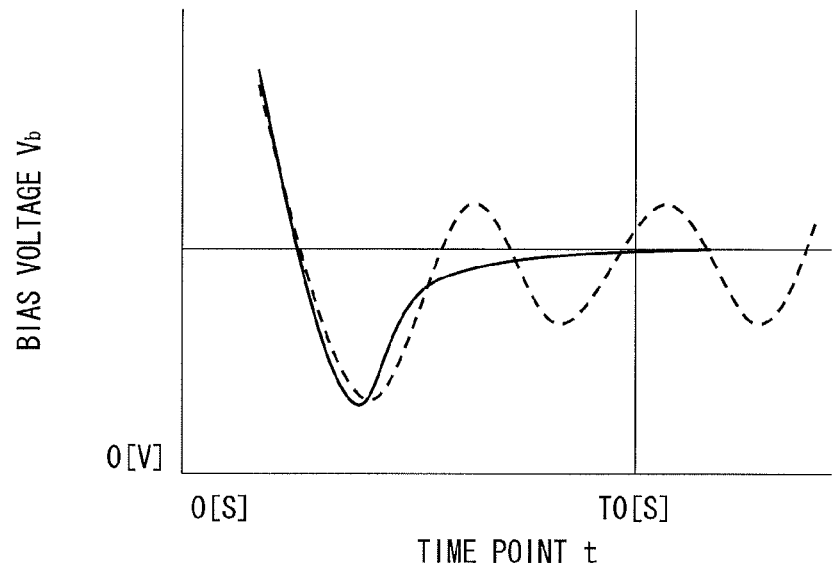
FIG. 4 is a typical graph illustrating how a bias voltage, which is generated by the operating point control section included in the optical modulation system illustrated in FIG. 1, changes over time. A solid line corresponds to a case where feedback control is stably carried out, whereas a dotted line corresponds to a case where feedback control is destabilized by a mixed low frequency noise.
Figure 5:
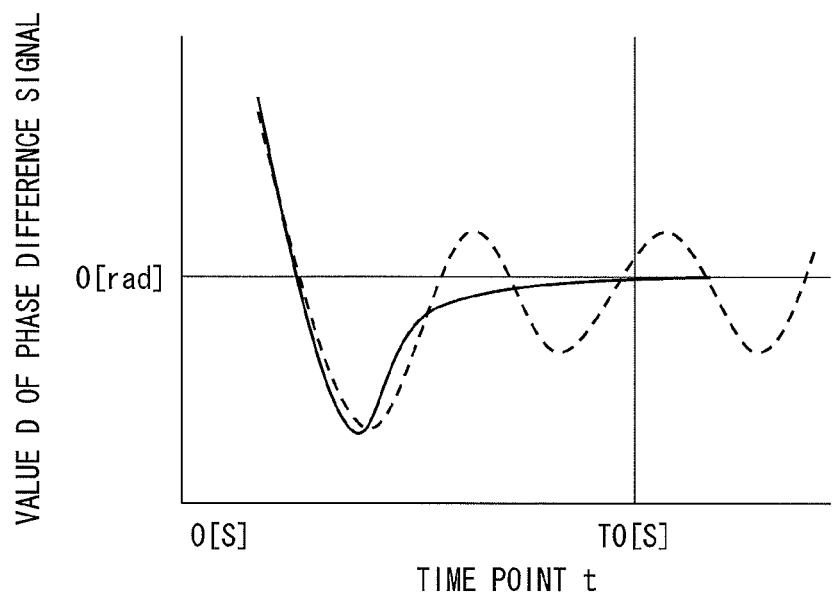
FIG. 5 is a typical graph illustrating how a value of a phase difference signal, which is generated by the low-frequency component detection section included in the optical modulation system illustrated in FIG. 1, changes over time. A solid line corresponds to a case where feedback control is stably carried out, whereas a dotted line corresponds to a case where feedback control is destabilized by a mixed low frequency noise.

The following description will discuss, with reference to FIGS. 4 and 5, how the judgment section 18 judges stability of feedback control.

FIG. 4 is a typical graph illustrating how a bias voltage Vb, with reference to which stability of feedback control is judged, changes over time. A solid line corresponds to a case where feedback control is stably carried out, whereas a dotted line corresponds to a case where feedback control is destabilized due to a mixed low frequency noise. A leftmost end (i.e., t=0) of the graph corresponds to (i) a time point at which the optical modulation system 1 starts to operate or (ii) a time point at which the switch 14c of the low frequency signal generating section 14 is switched.

In a case where no low frequency noise is mixed, the bias voltage Vb is autonomously adjusted by feedback control, and the bias voltage Vb converges to a constant voltage within a predetermined time period (i.e., within T0 second(s)) (see the solid line in FIG. 4). In a state where the bias voltage Vb converges to the constant voltage, (i) an intensity of light outputted by the MZ optical modulator 12 is minimized when the driving voltage V (i.e., a value of the driving signal #13) is a predetermined voltage V0 and (ii) an intensity of light outputted by the MZ optical modulator 12 is maximized when the driving voltage V is a predetermined voltage V1. On the other hand, in a case where a low frequency noise is mixed, the bias voltage Vb does not converge to a constant voltage but continues to fluctuate even after the predetermined time period has elapsed (see the dotted line in FIG. 4).

The judgment section 18 (i) evaluates a fluctuation amount ΔVb based on the bias voltage Vb sampled at a time point t (>T0) and (ii) judges stability of the feedback control based on the fluctuation amount ΔVb. Specifically, in a case where the fluctuation amount ΔVb exceeds a predetermined threshold Th, the judgment section 18 determines that the feedback control is unstable, and otherwise, the judgment section 18 determines that the feedback control is stable.

Note that the fluctuation amount ΔVb can be evaluated based on various evaluation methods. For example, in a case where (i) a maximum voltage $Vb_{max}$ and a minimum voltage $Vb_{min}$ of bias voltages Vb, which have been sampled during a time period (t−Δt, t), are specified and (ii) a fluctuation amount ΔVb is defined as a difference ($Vb_{max}$−$Vb_{min}$) at the time point t, Δt can be set to be longer than a time constant of the LPF 16e, for example. Note, however, that Δt should be set to be sufficiently shorter than a time constant (which is generally several minutes or longer) of the operating point drift.

Note that how to evaluate the fluctuation amount ΔVb is not limited to the method above described. Alternatively, a fluctuation amount ΔVb at a time point t can be defined as an absolute value |Vb(t)−Vb(t−Δt)|, where "Vb(t)" is a bias voltage at the time point t and "Vb(t−Δt)" is a bias voltage at a time point (t−Δt). In this case, Δt can be set to be nearly equal to the time constant of the LPF 16e.

FIG. 5 is a typical graph illustrating how a value D of a phase difference signal #15, with reference to which stability of feedback control is judged, changes over time. A solid line corresponds to a case where feedback control is stably carried out, whereas a dotted line corresponds to a case where feedback control is destabilized by a mixed low frequency noise. A leftmost end (i.e., t=0) of the graph corresponds to (i) a time point at which the optical modulation system 1 starts to operate or (ii) a time point at which the switch 14c of the low frequency signal generating section 14 is switched.

In a case where no low frequency noise is mixed, the bias voltage Vb is autonomously adjusted by feedback control, and the bias voltage Vb converges to a constant voltage within a predetermined time period (i.e., T0 second(s)), as above described. In a state where the bias voltage Vb converges to the constant voltage, the value D of the phase difference signal #15 keeps 0. On the other hand, in a case where a low frequency noise is mixed, the bias voltage Vb does not converge to the constant voltage, and therefore the phase difference signal #15 becomes a value D other than 0.

The judgment section 18 judges stability of feedback control based on a moving average of values D(t) of respective phase difference signals #15 sampled at time points t (>T0). Specifically, in a case where, for example, an average ΣD(t')/n of values D(t') of respective n phase difference signals #15, which have been sampled during a time period (t−Δt, t), exceeds a predetermined threshold Th, the judgment section 18 determines that the feedback control is unstable, and otherwise, the judgment section 18 determines that the feedback control is stable.

The judgment section 18 derives an ultimate result from (i) a first judgment result obtained based on a bias voltage Vb and (ii) a second judgment result obtained based on a value D of a phase difference signal #15. For example, in a case where both the first judgment result and the second judgment result indicate "stable", the judgment section 18 determines that the feedback control is stable, and otherwise, the judgment section 18 determines that the feedback control is unstable. Alternatively, in a case where both the first judgment result and the second judgment result indicate "unstable", the judgment section 18 determines that the feedback control is unstable, and otherwise, the judgment section 18 determines that the feedback control is stable.

According to Embodiment 1, stability of the feedback control is judged with the use of (i) the first judgment result obtained based on the bias voltage Vb and (ii) the second judgment result obtained based on the value D of the phase difference signal #15. Note, however, that Embodiment 1 is not limited to this. Alternatively, the judgment section 18 can ultimately determine the stability of the feedback control based only on (i) the bias voltage Vb or (ii) the value D of the phase difference signal #15.

Note that a judgment made based on the bias voltage Vb, has an advantage of capable of obtaining a judgment result which reflects more directly a status of the MZ optical modulator 12. On the other hand, a judgment, made based on the value D of the phase difference signal #15, has an advantage of being hardly affected by an operating point drift occurring in the MZ optical modulator 12. As is clear from Embodiment 1, in a case where stability of the feedback control is judged with the use of both (i) the first judgment result obtained based on the bias voltage Vb and (ii) the second judgment result obtained based on the value D of the phase difference signal #15, it is possible to obtain both the advantages brought about by the respective first and second judgment results.

According to Embodiment 1, the low frequency signal generating section 14 includes the first and second low frequency oscillators 14a and 14b which generate low frequency signals #12a and #12b that have different frequencies f0a and f0b, respectively. Note, however, that Embodiment 1 is not limited to this. Alternatively, the low frequency signal generating section 14 can include n (which is an arbitrary natural number of not smaller than 3) low frequency oscillators for generating respective low frequency signals having different frequencies f0[1], f0[2], . . . , and f0[n]. In this case, the judgment section 18 switches the frequency f0 of the low frequency signal #12 from f0[i] to f0[i+1] (from f0[n] to f0[1] in a case where i=n) each time a transition of the judgment result occurs from "stable" to "unstable" (note that "i"=1, 2, . . . , or n−1). It will be clear that, as the number n of low frequency oscillators is increased, feedback control is more likely to be stabilized with the use of any of the increased number of low frequency oscillators. Note that the low frequency signal generating section 14 can be configured by a VCO (voltage-controlled oscillator). In this case, the judgment section 18 changes a control voltage, which is to be applied to the VCO, each time a transition of the judgment result occurs from "stable" to "unstable." It is preferable to store, in a memory, a table in which control voltages V1, V2, ..., and Vn are stored so as to be associated with the different frequencies f0[1], f0[2], ..., and f0[n], respectively.

According to Embodiment 1, the frequency f0 of the low frequency signal #12 is toggled, each time a transition of the judgment result made by the judgment section 18 occurs from "stable" to "unstable." Note, however, that Embodiment 1 is not limited to this. Alternatively, each time a transition of the judgment result made by the judgment section 18 occurs from "stable" to "unstable", a frequency $f0_{best}$ is selected and then the frequency f0 of the low frequency signal #12 is set to the frequency $f0_{best}$. The frequency $f0_{best}$ is one of predetermined different frequencies f0[1], f0[2], ..., and f0[n] which allows feedback control to be carried out most stably. Examples of the frequency $f0_{best}$ encompass a frequency which causes a fluctuation amount ΔVb of the bias voltage Vb to be minimized.

According to Embodiment 1, the judgment section 18 is provided in the optical modulation system 1 so that the frequency f0 of the low frequency signal #12 can be switched automatically. Note, however, that Embodiment 1 is not limited to this. Alternatively, in a case where the frequency f0 of the low frequency signal #12 is switched manually, it is possible not to provide the judgment section 18 in the optical modulation system 1. In this case, for example, a DIP switch can be employed as the switch 14c.

[Embodiment 2]

Figure 6:
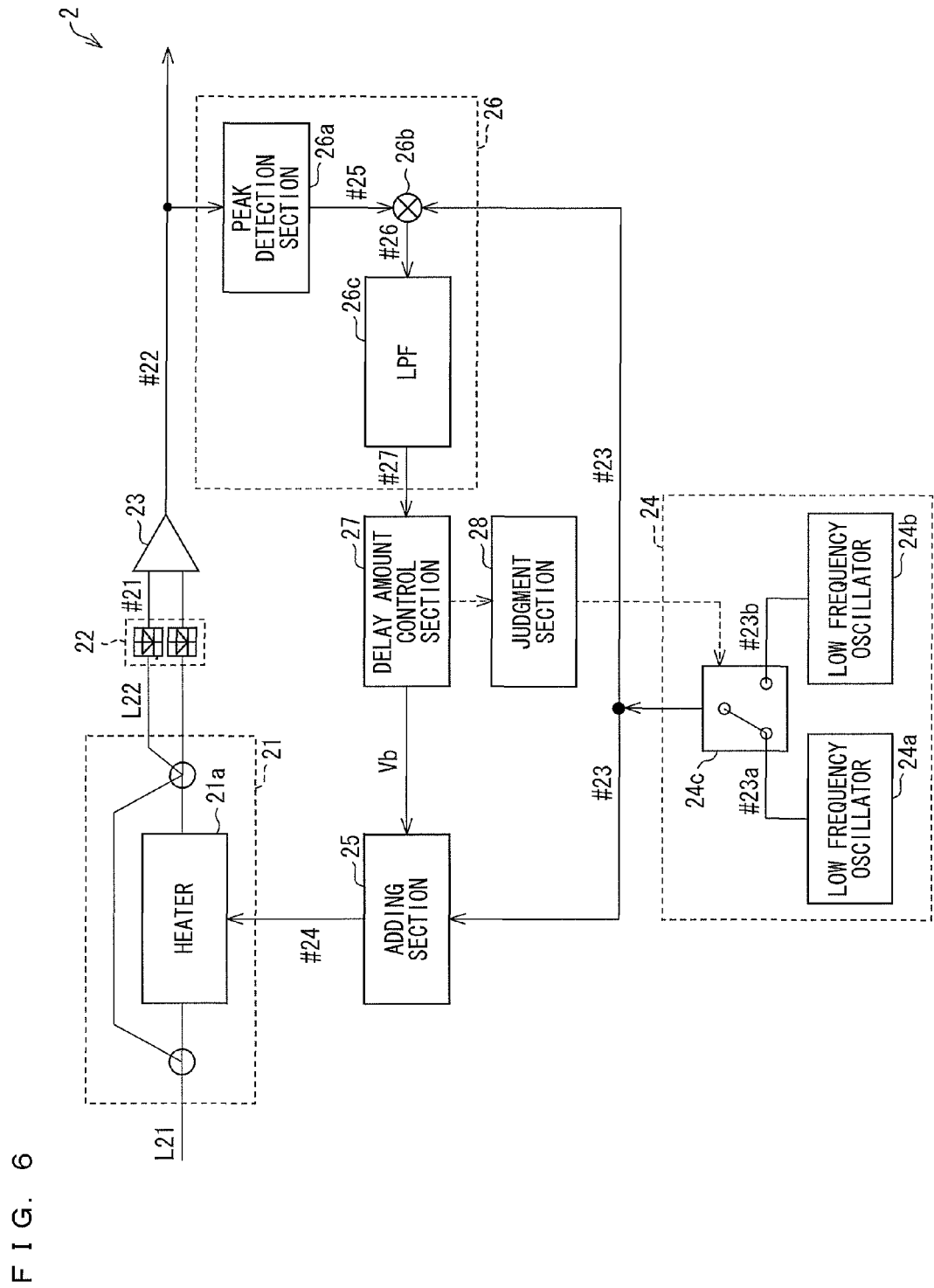
FIG. 6 is a block diagram illustrating a configuration of an optical modulation system, in accordance with Embodiment 2 of the present invention.
Figure 7:
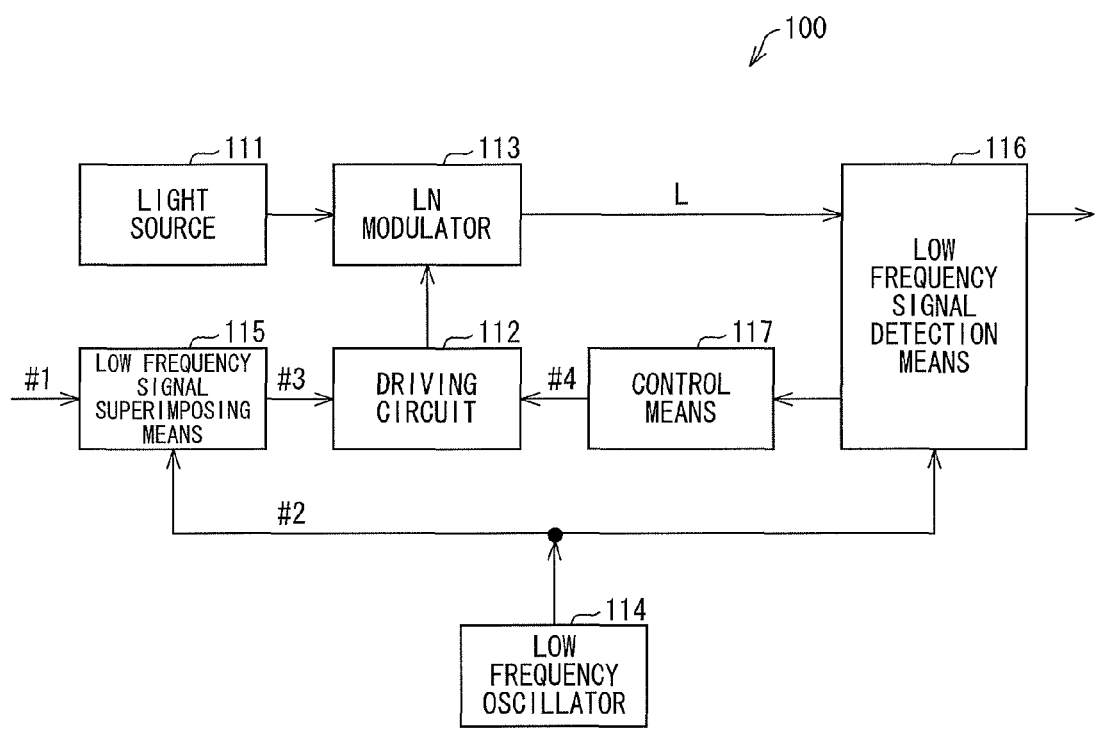
FIG. 7 is a block diagram illustrating a configuration of a conventional optical modulation system.

The following description will discuss a configuration of an optical demodulation system in accordance with Embodiment 2 of the present invention, with reference to FIG. 6. FIG. 6 is a block diagram illustrating a configuration of an optical demodulation system 2 in accordance with Embodiment 2.

The optical demodulation system 2 (i) generates a demodulated signal #22 by demodulating an optical signal L21 which has been subjected to a DBPSK modulation and (ii) supplies the demodulated signal #22 (data signal) to an outside of the optical demodulation system 2. The optical demodulation system 2 is incorporated in, for example, a receiver so as to be utilized to carry out optical communications.

The optical demodulation system 2 includes a delay interferometer 21, a pair of photodiodes 22, a transimpedance amplifier (hereinafter, referred to as "TIA") 23, a low frequency signal generating section 24, an adding section 25, a low-frequency component detection section 26, a delay amount control section 27, and a judgment section 28 (see FIG. 6).

The delay interferometer 21 is means for converting an optical signal L21, which has been subjected to a DBPSK modulation, into optical signals L22 which are subjected to intensity modulation, by causing (i) signal light corresponding to a current symbol and (ii) signal light corresponding to a previous symbol to be subjected to interference and synthesis. The delay interferometer 21 has (a) a first waveguide which has a shorter light path length and (b) a second waveguide which has a longer light path length. The delay interferometer 21 includes a heater 21a for heating a medium in the first waveguide. Namely, according to the delay interferometer 21, a voltage to be applied to the heater 21a is changed so that a delay amount of first signal light can be controlled with respect to second signal light. Note that (i) the first signal light has passed through the first waveguide and (ii) the second signal light has passed through the second waveguide.

The optical signals L22 generated by the delay interferometer 21 are converted into current signals #21 by the respective pair of photodiodes 22, and the current signals #21 are further differentially amplified by the TIA 23 so that a demodulated signal #22 is generated. The demodulated signal #22 is supplied (i) to the outside and (ii) to the low-frequency component detection section 26.

The low frequency signal generating section 24 is means for generating a low frequency signal #23. The low frequency signal #23 generated by the low frequency signal generating section 24 is supplied to the adding section 25 and the low-frequency component detection section 26. The low frequency signal generating section 24 is characterized by being capable of switching a frequency f0 of a low frequency signal #23 to be generated, as with the low frequency signal generating section 14 of Embodiment 1.

FIG. 6 illustrates an example configuration of the low frequency signal generating section 24. According to the example configuration illustrated in FIG. 6, the low frequency signal generating section 24 includes a first low frequency oscillator 24a, a second low frequency oscillator 24b, and a switch 24c.

According to the example configuration illustrated in FIG. 6, the first low frequency oscillator 24a generates a low frequency signal #23a having a predetermined frequency f0a. The second low frequency oscillator 24b generates a low frequency signal #23b having a predetermined frequency f0b. The frequencies f0a and f0b are (1) sufficiently lower than a frequency of a demodulated signal #22 and (2) different from each other. It is preferable that a ratio of f0a to f0b (f0a:f0b) is not a simple ratio of integers for the foregoing reasons. For example, the frequency f0a is 9.05 Hz, and the frequency f0b is 10 Hz.

According to the example configuration illustrated in FIG. 6, the low frequency signal #23a and the low frequency signal #23b are supplied to the switch 24c. The switch 24c (i) selects one of the low frequency signal #23a and the low frequency signal #23b and (ii) supplies, as a frequency signal #23, a selected one of the low frequency signals #23a and #23b to the adding section 25 and the low-frequency component detection section 26. In other words, the switch 24c (i) selects one of the frequency f0a and the frequency f0b and (ii) supplies a low frequency signal #23, which has selected one of the frequencies f0a and f0b, to the adding section 25 and the low-frequency component detection section 26.

Note that, in the following description, a frequency of the low frequency signal #23 will be referred to as "frequency f0." Specifically, in a case where the low frequency signal #23a is selected as the low frequency signal #23, the frequency f0 is equal to f0a, whereas in a case where the low frequency signal #23b is selected as the low frequency signal #23, the frequency f0 is equal to f0b.

The adding section 25 is means for generating a driving signal #24 for driving the heater 21a. Specifically, the adding section 25 generates a driving signal #24, which is used to drive the heater 21a, by adding a bias voltage Vb determined by the delay amount control section 27 (later described) to a voltage of the low frequency signal #23 generated by the low frequency signal generating section 24.

The low-frequency component detection section 26 is means for detecting a low-frequency component #25 having a frequency f0 (which is identical with that of the low frequency signal #23) contained in the demodulated signal #22. The low-frequency component detection section 26 is also means for comparing a phase of the low-frequency component #25 with a phase of the low frequency signal #23 so as to generate a phase difference signal #27 which varies depending on a difference between the two phases. A phase difference signal #27 generated by the low-frequency component detection section 26 is supplied to the delay amount control section 27.

FIG. 6 illustrates an example configuration of the low-frequency component detection section 26. According to the example configuration illustrated in FIG. 6, the low-frequency component detection section 26 includes a peak detection section 26a, a mixer 26b, and an LPF (low-pass filter) 26c. With the example configuration, the peak detection section 26a detects a low-frequency component #25 (corresponding to an envelope of a signal waveform of the demodulated signal #22) contained in the demodulated signal #22. The mixer 26b multiplies the low frequency signal #23 by the low-frequency component #25. The LPF 26c extracts a difference frequency component from an output signal #26 of the mixer 26b by removing a sum frequency component. The difference frequency component extracted by the LPF 26c is supplied, as a phase difference signal #27, to the delay amount control section 27.

The delay amount control section 27 is means for generating a bias voltage Vb in accordance with a phase difference signal #27. The bias voltage Vb generated by the delay amount control section 27 is not limited to a particular voltage, provided that the bias voltage Vb causes a phase drift, occurring in the delay interferometer 21, to be compensated. According to Embodiment 2, an integrated value obtained by integrating the phase difference signal #27 is employed as the bias voltage Vb. Note that examples of the delay amount control section 27 encompass an integrating circuit including an operational amplifier, as with the operating point control section 17 of Embodiment 1.

The voltage of the phase difference signal #27, which has been supplied to the delay amount control section 27, is converted by an AD converter (not illustrated) into a digital value and is then supplied to the judgment section 28. Moreover, the bias voltage Vb which is to be outputted from the delay amount control section 27 is converted by an AD converter (not illustrated) into a digital value and is then supplied to the judgment section 28. The judgment section 28 is means for judging stability of feedback control based on the voltage of the phase difference signal #27 and the bias voltage Vb. Examples of the judgment section 28 encompass a microcomputer. The judgment section 28 judges stability of feedback control in a manner similar to that of the judgment section 18 of Embodiment 1.

Each time a transition in judgment result occurs from "stable" to "unstable", the judgment section 28 controls the low frequency signal generating section 24 to change a frequency f0 of a low frequency signal #23 to be generated. Specifically, each time a transition in judgment result occurs from "stable" to "unstable", the judgment section 28 controls switching of the switch 24c in the low frequency signal generating section 24. As a result, (1) in a case where the transition in judgment result occurs from "stable" to "unstable" while the frequency f0 of the low frequency signal #23 is being f0a, the frequency f0 is switched from f0a to f0b, whereas (2) in a case where the transition in judgment result occurs from "stable" to "unstable" while the frequency f0 is being f0b, the frequency f0 is switched from f0b to f0a.

This makes it possible to stabilize the feedback control in both cases where (1) the feedback control is destabilized because a low frequency noise having a frequency f0a is mixed while the frequency f0 of the low frequency signal #23 is being f0a and (2) the feedback control is destabilized because a low frequency noise having a frequency f0b is mixed while the frequency f0 of the low frequency signal #23 is being f0b. That is, even in a case where a low frequency noise is mixed, a stable feedback control can be restored.

According to Embodiment 2 also, the low frequency signal generating section 24 includes the first and second low frequency oscillators 24a and 24b which generate low frequency signals #23a and #23b that have different frequencies f0a and f0b, respectively. Note, however, that Embodiment 2 is not limited to this. Alternatively, the low frequency signal generating section 24 can include n (which is an arbitrary natural number of not smaller than 3) low frequency oscillators for generating respective low frequency signals having different frequencies f0[1], f0[2], . . . , and f0[n]. In this case, the judgment section 28 switches the frequency f0 of the low frequency signal #23 from f0[i] to f0[i+1] (from f0[n] to f0[1] in a case where i=n) each time a transition of the judgment result occurs from "stable" to "unstable" (note that "i"=1, 2, . . . , or n−1). It will be clear that, as the number n of low frequency oscillators is increased, feedback control is more likely to be stabilized with the use of any of the increased number of low frequency oscillators. Note that the low frequency signal generating section 24 can be configured by a VCO (voltage-controlled oscillator). In this case, the judgment section 28 changes a control voltage, which is to be applied to the VCO, each time a transition of the judgment result occurs from "stable" to "unstable." It is preferable to store, in a memory, a table in which control voltages V1, V2, . . . , and Vn are stored so as to be associated with the different frequencies f0[1], f0[2], . . . , and f0[n], respectively.

According to Embodiment 2, the frequency f0 of the low frequency signal #23 is switched between two fixed frequencies, each time a transition of the judgment result made by the judgment section 28 occurs from "stable" to "unstable." Note, however, that Embodiment 2 is not limited to this. Alternatively, each time a transition of the judgment result made by the judgment section 28 occurs from "stable" to "unstable", a frequency $f0_{best}$ is selected and then the frequency f0 of the low frequency signal #23 is set to the frequency $f0_{best}$. The frequency f0best is one of predetermined different frequencies f0[1], f0[2], . . . , and f0[n] which allows feedback control to be carried out most stably. Examples of the frequency $f0_{best}$ encompass a frequency which causes a fluctuation amount ΔVb of the bias voltage Vb to be minimized.

According to Embodiment 2, the judgment section 28 is provided in the optical demodulation system 2 so that the frequency f0 of the low frequency signal #23 can be switched automatically. Note, however, that Embodiment 2 is not limited to this. Alternatively, in a case where the frequency f0 of the low frequency signal #23 is switched manually, it is possible not to provide the judgment section 28 in the optical demodulation system 2. In this case, for example, a DIP switch can be employed as the switch 24c.

Embodiment 2 has discussed an example in which the present invention is applied to a DBPSK demodulator. Note, however, that an application scope of the present invention is not limited to this. The present invention is applicable to, for example, a DQPSK demodulator having two delay interferometers.

[Main Points]

As above described, the compensation method of Embodiments 1 and 2 is a method for compensating an operating point drift or a phase drift, which occurs in an optical device, by carrying out feedback control with use of a low frequency signal, the method including the steps of: (A) judging stability of the feedback control; and (B) switching a frequency of the low frequency signal from a first frequency to a second frequency which is different from the first frequency, in a case where the feedback control is determined to be unstable in the step (A).

According to the configuration, in a case where the feedback control is destabilized by a factor such as a low frequency noise having a frequency approximate to the frequency of the low frequency signal, the feedback control can be stabilized again by switching the frequency of the low frequency signal from the first frequency to the second frequency. That is, according to the configuration, a compensation method can be provided in which feedback control can be carried out more stably. Note that the step (A) of judging stability of the feedback control can be carried out by a device (e.g., an optical modulation system or an optical demodulation system later described) or an operator.

Note that the optical device is, for example, a branch interferometer. The branch interferometer is an optical device which has (1) a function to branch input light into first light that enters a first waveguide and second light that enters a second waveguide, (2) a function to cause a phase difference between (a) the first light propagating through the first waveguide and (b) the second light propagating through the second waveguide, and (3) a function to generate output light by causing the first light emitted from the first waveguide and the second light emitted from the second waveguide to interfere with each other. Examples of the branch interferometer encompass (i) a Mach-Zehnder optical modulator that is a branch interferometer which functions as an optical modulator and (ii) a delay interferometer that is a branch interferometer which functions as an optical demodulator.

In a case where the optical device is the branch interferometer, the low frequency signal is superimposed on a control signal for controlling the phase difference. In a case where the optical device is a Mach-Zehnder optical modulator, the phase difference is controlled by (i) an electric potential of an input signal (data signal) supplied to the Mach-Zehnder optical modulator and (ii) a bias voltage applied to the Mach-Zehnder optical modulator. According to the configuration, the low frequency signal is not limited to a particular one, provided that the low frequency signal (i) is superimposed on the input signal or the bias voltage and (ii) has a frequency lower than that of the input signal. In a case where the optical device is a delay interferometer, the phase difference is controlled by a bias voltage applied to the delay interferometer. According to the configuration, the low frequency signal is not limited to a particular one, provided that the low frequency signal (i) is superimposed on the bias voltage and (ii) has a frequency lower than that of an output signal (demodulated data signal) outputted by the delay interferometer.

According to the compensation method of the embodiments, the step (A) includes at least one of a first judging step and a second judging step, in the first judging step, the stability of the feedback control being determined by comparing (i) a moving average of phase differences between (a) low-frequency components contained in a signal generated by the optical device and (b) the low frequency signal with (ii) a predetermined threshold, and, in the second judging step, the stability of the feedback control being determined by comparing (i) a variation in bias which is to be given to the optical device and is determined in accordance with the phase difference with (ii) a predetermined threshold.

In a case where the feedback control is destabilized, the moving average of the phase differences does not converge to 0. This makes it possible to accurately determine stability of the feedback control in the first judging step. Moreover, in a case where the feedback control is destabilized, the bias does not converge to a constant value. In other words, a variation in bias does not converge to 0. This makes it possible to accurately determine stability of the feedback control also in the second judging step. Note that a value of a bias to be given to the optical device is obtained by, for example, integrating the phase difference.

According to the configuration, the step (A) includes at least one of the first judging step and the second judging step. This makes it possible to accurately determine stability of the feedback control. In a case where the step (A) includes both the first judging step and the second judging step, it is possible to determine stability of the feedback control further accurately.

According to the compensation method of the embodiments, it is preferable that a ratio of the first frequency to the second frequency is not a simple ratio of integers.

In a system including the optical device, a low frequency noise group, including low frequency noises having different frequencies, is sometimes mixed. The frequencies of the respective low frequency noises included in the low frequency noise group tend to be in a simple ratio of integers. Such a low frequency noise group is typically a higher harmonic noises caused in a power supply device. In a case where a ratio of the first frequency to the second frequency is a simple ratio of integers, feedback control sometimes cannot be stabilized even by switching the frequency of the low frequency signal from the first frequency to the second frequency. On the other hand, in a case where the ratio of the first frequency to the second frequency is not a simple ratio of integers, feedback control is more likely to be stabilized without causing such a problem. Note that the term "simple ratio of integers" means a ratio which can be expressed by small integers, e.g., integers not larger than 10.

As described in Embodiment 1, the optical device is, for example, a Mach-Zehnder optical modulator. In this case, an operating point drift occurring in the Mach-Zehnder optical modulator can be compensated by the feedback control. Moreover, as described in Embodiment 2, the optical device is, for example, a delay interferometer. In this case, a phase drift occurring in the delay interferometer can be compensated by the feedback control.

The optical modulation system of Embodiment 1 is an optical modulation system having a function to compensate an operating point drift, which occurs in an optical modulator, by carrying out feedback control with the use of a low frequency signal, the optical modulation system including: a low frequency signal generating section for generating the low frequency signal whose frequency is switchable.

According to the configuration, in a case where the feedback control is destabilized by a factor such as a low frequency noise having a frequency approximate to the frequency of the low frequency signal, the feedback control can be stabilized again by switching the frequency of the low frequency signal. That is, according to the configuration, an optical modulation system can be provided which can carry out feedback control more stably.

Note that a frequency of a low frequency noise (e.g., a spike noise derived from a switching regulator) derived from a power supply device varies depending on a temperature or on a configuration of a power supply device used together. Under the circumstances, in a case where the temperature is changed and/or the power supply device used together is changed, a stable feedback control may be destabilized. Even in such a case, according to the configuration of the present invention, the feedback control can be stabilized again by switching the frequency of the low frequency signal.

In addition to the low frequency signal generating section for generating a low frequency signal, the optical modulation system can include, for example, (1) a low frequency signal superimposing section for generating a driving signal by superimposing the low frequency signal on an input signal, (2) a Mach-Zehnder optical modulator for generating an optical signal by modulating intensity of continuous light in accordance with the driving signal, (3) a low-frequency component detection section for detecting a low-frequency component contained in the optical signal so as to generate a phase difference signal having a voltage corresponding to a phase difference between the detected low-frequency component and the low frequency signal, and (4) an operating point control section for generating a bias voltage in accordance with the phase difference signal so as to apply the generated bias voltage to the Mach-Zehnder optical modulator. Instead of the configuration in which the low frequency signal is superimposed on the input signal, it is possible to employ a configuration in which the low frequency signal is superimposed on the bias voltage.

Note that, according to the optical modulation system, the frequency of the low frequency signal can be switched manually or automatically. In a case where the frequency of the low frequency signal is switched automatically, the optical modulation system can further includes a judgment section for judging stability of the feedback control, in a case where the judgment section determines that the feedback control is unstable, the low frequency signal generating section automatically switching the frequency of the low frequency signal from a first frequency to a second frequency.

The optical demodulation system of Embodiment 2 is an optical demodulation system having a function to compensate a phase drift, which occurs in an optical demodulator, by carrying out feedback control with the use of a low frequency signal, the optical demodulation system including: a low frequency signal generating section for generating the low frequency signal whose frequency is switchable.

According to the configuration, in a case where the feedback control is destabilized by a factor such as a low frequency noise having a frequency approximate to the frequency of the low frequency signal, the feedback control can be stabilized again by switching the frequency of the low frequency signal. That is, according to the configuration, an optical demodulation system can be provided which can carry out feedback control more stably.

In addition to the low frequency signal generating section for generating a low frequency signal, the optical demodulation system can include, for example, (1) an adding section for generating a driving signal by adding the low frequency signal to a bias voltage, (2) a delay interferometer for converting an optical signal, whose phase has been modulated, into another optical signal whose intensity is modulated, the delay interferometer having (i) two waveguides that have different light path lengths and (ii) a heater for heating any of the two waveguides in response to the driving signal, (3) a low-frequency component detection section for detecting a low-frequency component contained in the another optical signal, whose intensity has been modulated, so as to generate a phase difference signal having a voltage corresponding to a phase difference between the detected low-frequency component and the low frequency signal, and (4) a delay amount control section for generating a bias voltage, as the bias voltage to be added to the low frequency signal, in accordance with a voltage of the phase difference signal.

Note that, according to the optical demodulation system, the frequency of the low frequency signal can be switched manually or automatically. In a case where the frequency of the low frequency signal is switched automatically, the optical demodulation system can further includes a judgment section for judging stability of the feedback control, in a case where the judgment section determines that the feedback control is unstable, the low frequency signal generating section automatically switching the frequency of the low frequency signal from a first frequency to a second frequency.

INDUSTRIAL APPLICABILITY

The present invention is suitably applicable to a system such as (i) an optical modulation system including an MZ optical modulator or (ii) an optical demodulation system including a delay interferometer.

REFERENCE SIGNS LIST

1: Optical modulation system
11: Light source
12: MZ optical modulator (optical device)
13: Light branching section
14: Low frequency signal generating section
15: Low frequency signal superimposing section
16: Low-frequency component detection section
17: Operating point control section
18: Judgment section
2: Optical demodulation system
21: Delay interferometer (optical device)
22: Photodiode
23: Transimpedance amplifier
24: Low frequency signal generating section
25: Adding section
26: Low-frequency component detection section
27: Delay amount control section
28: Judgment section

The invention claimed is:

1. A method for compensating an operating point drift or a phase drift, which occurs in an optical device, by carrying out feedback control with use of a low frequency signal, said method comprising the steps of:
   (A) judging stability of the feedback control; and
   (B) switching a frequency of the low frequency signal from a first frequency to a second frequency which is different from the first frequency, in a case where the feedback control is determined to be unstable in the step (A),
   the step (A) including at least one of a first judging step and a second judging step,
   in the first judging step, the stability of the feedback control being determined by comparing (i) a moving average of phase differences between (a) low-frequency components contained in a signal generated by the optical device and (b) the low frequency signal with (ii) a predetermined threshold, and
   in the second judging step, the stability of the feedback control being determined by comparing (i) a variation in bias which is to be given to the optical device and is determined in accordance with the phase difference with (ii) a predetermined threshold.

2. The method as set forth in claim 1, wherein:
   a ratio of the first frequency to the second frequency is not a ratio of integers, the ratio of integers being a ratio expressed by integers not larger than 10.

3. The method as set forth in claim 1, wherein:
   the optical device is a Mach-Zehnder optical modulator; and
   an operating point drift occurring in the Mach-Zehnder optical modulator is compensated by the feedback control.

4. The method as set forth in claim 1, wherein:
the optical device is a delay interferometer; and
a phase drift occurring in the delay interferometer is compensated by the feedback control.

5. An optical modulation system having a function to compensate an operating point drift, which occurs in an optical modulator, by carrying out feedback control with use of a low frequency signal, said optical modulation system comprising:

a judgment section for judging stability of the feedback control; and a low frequency signal generating section for generating the low frequency signal, in a case where the judgment section determines that the feedback control is unstable, the low frequency signal generating section switching a frequency of the low frequency signal from a first frequency to a second frequency which is different from the first frequency, the judgment section including at least one of a first judgment section and a second judgment section, the first judgment section determining the stability of the feedback control by comparing (i) a moving average of phase differences between (a) low-frequency components contained in a signal generated by the optical modulator and (b) the low frequency signal with (ii) a predetermined threshold, and the second judgment section determining the stability of the feedback control by comparing (i) a variation in bias which is to be given to the optical modulator and is determined in accordance with the phase difference with (ii) a predetermined threshold.

6. An optical demodulation system having a function to compensate a phase drift, which occurs in an optical demodulator, by carrying out feedback control with use of a low frequency signal, said optical demodulation system comprising:

a judgment section for judging stability of the feedback control; and a low frequency signal generating section for generating the low frequency signal, in a case where the judgment section determines that the feedback control is unstable, the low frequency signal generating section switching a frequency of the low frequency signal from a first frequency to a second frequency which is different from the first frequency, the judgment section including at least one of a first judgment section and a second judgment section, the first judgment section determining the stability of the feedback control by comparing (i) a moving average of phase differences between (a) low-frequency components contained in a signal generated by the optical demodulator and (b) the low frequency signal with (ii) a predetermined threshold, and the second judgment section determining the stability of the feedback control by comparing (i) a variation in bias which is to be given to the optical demodulator and is determined in accordance with the phase difference with (ii) a predetermined threshold.

* * * * *